Patented Mar. 2, 1937

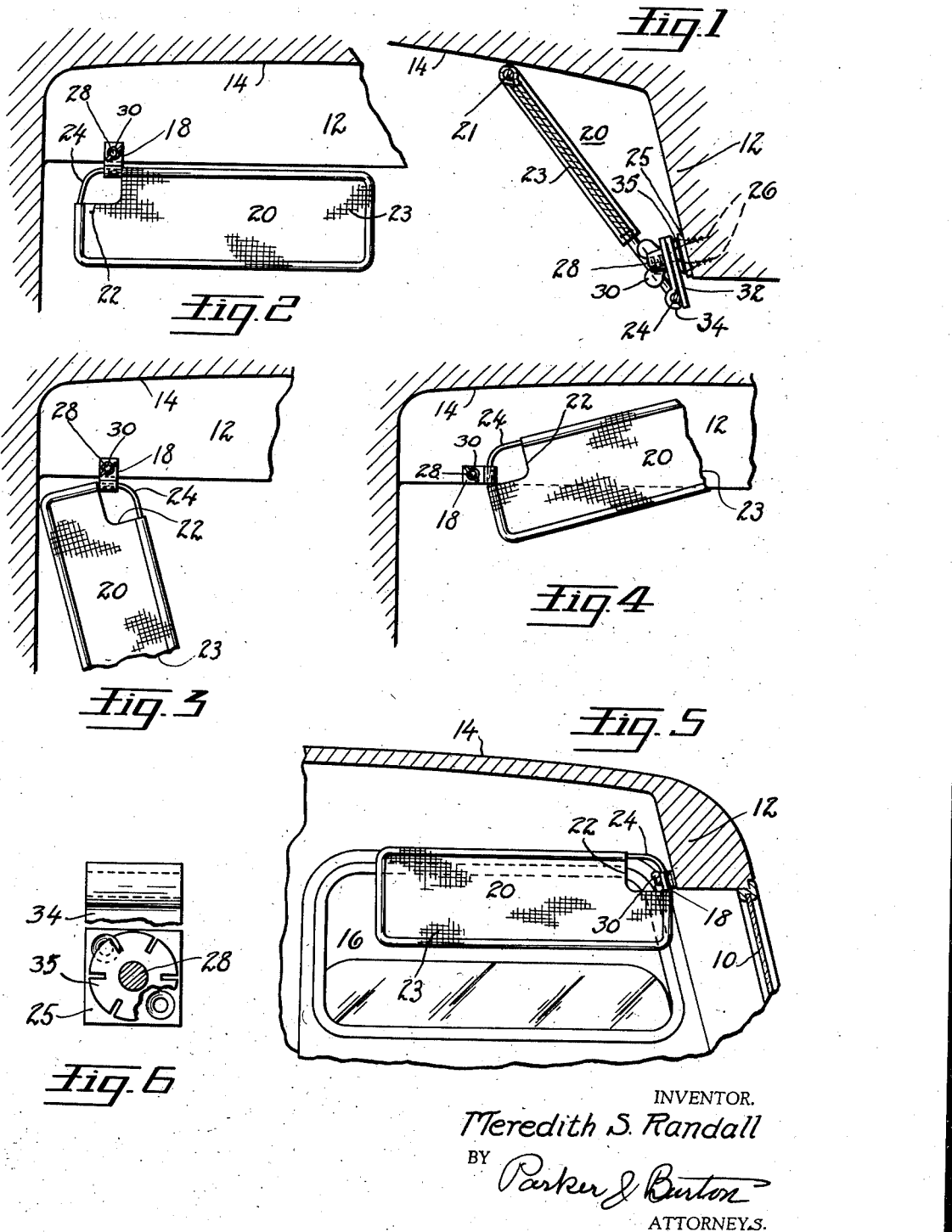

2,072,648

UNITED STATES PATENT OFFICE 2,072,648

VISOR CONSTRUCTION

Meredith S. Randall, Detroit, Mich., assignor to Woodall Industries Incorporated, Detroit, Mich., a corporation of Michigan Application October 12, 1934, Serial No. 748,050

12 Claims. (Cl. 296—97)

My invention relates to improvements in sun visor construction and particularly to an improved type of visor and mounting therefor adapted for use in vehicle bodies as an interior visor adjustable to overlie either the windshield or a side window of the body structure.

An object is to provide a visor which is simple, inexpensive, and of rugged construction and which is readily adjustable from a position of non use to a position overlying the windshield or to a position overlying a side window of the body.

Another object is to provide a visor which has at one corner a supporting member that is engaged by the bracket which carries the visor, which supporting member extends for a portion of its length lengthwise of the visor and for another portion of its length transversely of the visor, and which is so supported as to be slidable through and swingable with respect to said bracket to position said visor in a multiplicity of positions.

Another object is the provision of a visor having a supporting frame, which carries a panel that forms the light obstruction portion of the visor, and which panel is cut away at one corner of the visor exposing the frame for a portion of the length of the visor and also for a portion of the width of the visor.

A simple type of a bracket clamp is engaged with the exposed portion of the frame in such manner that the visor may be swung from a position of non use to a position overlying the windshield and the visor may be moved from a position overlying the windshield to a position overlying a side window of the vehicle.

Other objects, advantages and meritorious features of my invention will more fully appear from the following description, appended claims, and accompanying drawing, wherein:

Fig. 1 illustrates a visor embodying my invention in a motor vehicle and in a position of non use, Fig. 2 illustrates the visor swung down to a position overlying the windshield, Figs. 3 and 4 illustrate movements of the visor to bring it to a position overlying a side window, Fig. 5 illustrates the visor in a position overlying the side window, and Fig. 6 is an elevation of a bracket or clamp suitable for use with my improved visor.

In automobile body construction it is common practice to provide visors within the bodies which are adapted to shield the eyes of the driver from the sun and which may be moved from a position overlying the windshield to a position overlying a side window. To enable the visor to be shifted to these diverse positions it is common practice to provide a support which includes a universal joint and mechanism operable to maintain the visor at any adjusted position. I propose to provide a visor which is of simple construction and carried by a simple clamping device yet which is adapted to occupy any of the positions desired.

In the several figures of the drawing I have shown a visor in use in a body which includes a front windshield 10, a header 12 which surmounts the windshield, a roof 14 extending rearwardly of the header and a side window 16 arranged adjacent to and rearwardly of the windshield. The visor is carried by the header through the embodiment of a bracket indicated in assembly as 18. The visor is indicated in assembly as 20. It comprises a frame 21 which carries a panel portion 23. The frame is here shown in the form of a wire bent to shape. The panel portion is cut away at one corner as at 22 exposing the wire at such corner as at 24. It will be noted that the wire is exposed at one corner for a portion of the length of the visor and also for a portion of the width of the visor and that such corner is rounded for a purpose hereinafter described.

The clamp or bracket includes a base portion 25 which may be secured by screws 26 to the header. This base portion carries stud 28. The stud is threaded to receive a wing nut 30. The bracket assembly includes a pair of clamping members indicated as 32 and 34 which are so formed as to receive between them the exposed portion 24 of the wire frame as shown in the several figures of the drawing. There is a dished lock washer 35 having a plurality of prongs, which is of a conventional construction, interposed above the base 25 below the clamping members 32 and 34 so that when the wing nut is tightened it will tend to retain the visor at any position to which the members 32 and 34 engage the wire.

Upon release of the wing nut the visor may be readily swung from the position shown in Fig. 1 to that shown in Fig. 2. In such position it overlies the windshield and obstructs the passage of the sun therethrough to the eyes of the driver. The visor may also be swung to the position shown in Fig. 5. To accomplish this the wing nut is loosened and the visor is moved by a slidable movement of the wire through the clamping mechanism to the position shown in Fig. 3. There is a certain amount of play in the channel formed in the clamping member 34 about the wire and the wire is so curved at the corner as to permit it to be slidably moved from the position of Fig. 2 to that of Fig. 3 when the wing nut is released. When the visor is in the position shown in Fig. 3 the clamping members 32 and 34 may be swung from the position shown in Fig. 2 to that shown in Fig. 4 by rotation about the stud 28. The visor may then be swung outwardly toward the side window as shown in Fig. 5 and used as a shield for said side window.

What I claim:

1. A vehicle body having a front windshield and an adjacent side window, a visor having a frame exposed at one corner for a portion of the length of the visor and for a portion of the width of the visor, a supporting bracket engaging said exposed portion of the frame to support the visor for swinging movement about the frame as a pivot within the bracket, said frame being slidable lengthwise through said bracket to bring either the portion extending lengthwise or the portion extending crosswise of the frame into engagement by the bracket, said visor being swingable about either the lengthwise or crosswise portion of the frame within the bracket.

2. A vehicle body having a front windshield and an adjacent side window, a visor having a frame exposed at one corner for a portion of the length of the visor and for a portion of the width of the visor, a supporting bracket engaging said exposed portion of the frame to support the visor, said frame portion being slidable lengthwise through said bracket from a position of engagement of the bracket with the width portion of the frame to a position of engagement of the bracket with the length portion of the frame, said visor being swingable upon said frame as an axis within the bracket when the bracket is engaged either with the width portion or the length portion of the frame, said bracket being swivelled for turning movement about an axis normal to the frame gripping portion thereof.

3. A vehicle body having a front windshield, a header surmounting the windshield, a side window positioned adjacent to and rearwardly of the windshield, a visor having an angular supporting frame at one corner extending for a portion of the width of the visor and for a portion of the length of the visor, a supporting bracket secured to the header and engaging said frame permitting slidable lengthwise adjustment of the frame with respect to the bracket, said bracket adapted to grip said angular portion of the frame along the length portion or along the width portion thereof supporting the same at adjusted positions, said visor being swingable about either portion of the frame as a pivot with respect to the bracket, said bracket being swivelled for rotatable adjustment to support the visor for swinging movement about a horizontal axis or about a vertical axis.

4. A visor comprising a substantially rectangular frame, a panel carried thereby cut away at one corner exposing said frame adjacent to said corner for a portion of the length of the visor and for a portion of the width of the visor, a support engaging the exposed portion of the frame permitting slidable adjustment of said exposed portion throughout its entire length through said support and pivotal swinging movement of the visor panel about said exposed frame portion as a pivot and within said support at any point through the length of said exposed portion.

5. A visor comprising a substantially oblong frame, a panel carried thereby cut away at one corner of the frame exposing the frame for a portion of the length of the visor and for a portion of the width of the visor and a bracket gripping the exposed portion of said frame for swinging movement of the visor with respect thereto and to permit slidable movement of the frame with respect to the bracket.

6. A visor having at one corner a supporting rod extending for a portion of its length lengthwise of the visor and extending for another portion of its length transversely of the visor, a supporting bracket having a clamp engaging said rod for swinging movement of the visor about said rod as a pivot, said clamp being swivelled for adjustment to position said pivot vertically or horizontally, said rod being slidably adjustable through the clamp to bring either that portion of the rod extending lengthwise of the visor or that portion extending transversely of the visor into position within the clamp for pivotal swinging movement therein either about a horizontal pivot or a vertical pivot.

7. A visor having a pivot arranged in curved formation adjacent its upper edge, a supporting clamp engaging said pivot to support the visor for pivotal adjustment, said pivot being longitudinally adjustable throughout its entire length with respect to said clamp and being pivotally adjustable within said clamp at any point of its longitudinal adjustment therein, said clamp being swivelled for turning movement.

8. A visor provided with an angular pivot extending in one direction length wise of the visor and in another direction transversely of the visor, a support gripping said pivot permitting rotation of the pivot with respect thereto and adapted to support the visor at any position to which it may be swung, said pivot being slidably adjustable lengthwise through said support, said support being swivelled for turning movement.

9. A visor having a supporting member provided with one part extending lengthwise of the visor and another part extending transversely of the visor, a supporting bracket engaging said supporting member to permit swinging movement of the visor upon said member as a pivot, said member being shiftable lengthwise with respect to said bracket whereby either that portion of the member extending transversely of the visor or that portion of the member extending linearly of the visor may be gripped by said bracket.

10. A visor having a supporting member arranged in a gradually curved formation, a supporting bracket engaging said supporting member to permit swinging movement of the visor about said member as a pivot, said curved member being shiftable lengthwise through said supporting bracket to present different sections of its curved formation to the bracket whereby the visor may be pivoted in a plurality of planes angularly different from one another.

11. A visor having a supporting rod arranged in a gradually curved formation, a supporting bracket engaging said rod and adapted to permit swinging movement of the visor body about the rod as a pivotal axis, said bracket adapted to engage said rod at any point along its curved extent and pivot the visor thereabout whereby the visor may be adjusted to swing in a plurality of planes angularly disposed to one another.

12. In an automobile body, a clamping bracket adjacent the front windshield thereof, a visor having a metal rigidifying frame, said frame including a curved element adapted to be gripped by said clamping bracket to support the visor thereby and to form a pivotal connection about which the visor may be swung, said element being slidably adjustable through said bracket to present different sections of its curved contour to the clamping action of said bracket whereby the body of the visor may be swung in a plurality of angularly different planes depending on the section of the element gripped by the bracket.

MEREDITH S. RANDALL.